US012750082B2

(12) United States Patent
Lin et al.

(10) Patent No.: US 12,750,082 B2
(45) Date of Patent: Sep. 29, 2026

(54) WIRELESS RF FRONT END CIRCUIT AND WIRELESS SIGNAL BOOSTING DEVICE HAVING THE WIRELESS RF FRONT END CIRCUIT

(71) Applicant: Moxa Inc., New Taipei City (TW)

(72) Inventors: Hsuan-Hung Lin, New Taipei City (TW); Jung-Chieh Ko, New Taipei City (TW)

(73) Assignee: Moxa Inc., New Taipei City (TW)

( * ) Notice: Subject to any disclaimer, the term of this patent is extended or adjusted under 35 U.S.C. 154(b) by 286 days.

(21) Appl. No.: 18/639,985

(22) Filed: Apr. 19, 2024

(65) Prior Publication Data

US 2024/0267078 A1 Aug. 8, 2024

Related U.S. Application Data

(63) Continuation-in-part of application No. 18/311,241, filed on May 3, 2023, now Pat. No. 12,634,102.

(60) Provisional application No. 63/417,703, filed on Oct. 20, 2022.

(51) Int. Cl.

*H04B 1/44* (2006.01)
*H04B 1/00* (2006.01)
*H04B 1/04* (2006.01)

(52) U.S. Cl.

CPC ............. *H04B 1/44* (2013.01); *H04B 1/0078* (2013.01); *H04B 1/0483* (2013.01)

(58) Field of Classification Search

CPC ....... H04B 1/44; H04B 1/0078; H04B 1/0483
See application file for complete search history.

(56) References Cited

U.S. PATENT DOCUMENTS

| | | | | |
|---|---|---|---|---|
| 5,619,190 | A | 4/1997 | Duckworth et al. | |
| 6,311,045 | B1 | 10/2001 | Domokos | |
| 7,305,218 | B2 | 12/2007 | Yun | |
| 8,467,738 | B2 | 6/2013 | Gorbachov | |
| 2007/0049225 | A1 * | 3/2007 | Yoon ........................ | H04B 1/44 455/217 |

(Continued)

FOREIGN PATENT DOCUMENTS

| | | |
|---|---|---|
| EP | 2127094 | 12/2010 |
| TW | 202147739 A | 12/2021 |

OTHER PUBLICATIONS

"Notice of allowance of Taiwan counterpart Application", issued on Dec. 10, 2025, p. 1-p. 3.

(Continued)

*Primary Examiner* — John J Lee
(74) *Attorney, Agent, or Firm* — JCIPRNET

(57) ABSTRACT

A wireless RF front end circuit and a wireless signal boosting device are provided. The wireless RF front end circuit includes a first switch, a second switch, an adjustable amplifier circuit, and a detection circuit. The second switch is electrically connected to the first switch through a first path or a second path. The adjustable amplifier circuit is disposed in the first path between the first switch and the second switch. The detection circuit is electrically connected to the first switch and the second switch and configured to detect a transmitting signal, wherein the detection circuit configures the first switch and the second switch to enable the first path and disable the second path in response to the transmitting signal has been detected.

13 Claims, 6 Drawing Sheets

(56) References Cited

U.S. PATENT DOCUMENTS

| | | | | |
|---|---|---|---|---|
| 2009/0285270 | A1 | 11/2009 | Wong | |
| 2013/0072137 | A1 | 3/2013 | Carney et al. | |
| 2015/0312018 | A1* | 10/2015 | Li | H04B 1/0458 370/278 |
| 2018/0226932 | A1 | 8/2018 | Beaudin et al. | |
| 2024/0097724 | A1* | 3/2024 | Rimini | H04B 1/0483 |

OTHER PUBLICATIONS

"Office Action of Taiwan Counterpart Application", issued on Apr. 29, 2025, p. 1-p. 8.

* cited by examiner

WIRELESS RF FRONT END CIRCUIT AND WIRELESS SIGNAL BOOSTING DEVICE HAVING THE WIRELESS RF FRONT END CIRCUIT

CROSS REFERENCE OF RELATED APPLICATION

This is a continuation-in-part application of and claims the priority benefit of U.S. patent application Ser. No. 18/311,241, filed on May 3, 2023, which claims priority benefit of U.S. provisional application Ser. No. 63/417,703 filed on Oct. 20, 2022. The entirety of each of the above-mentioned patent applications is hereby incorporated by reference herein and made a part of this specification.

TECHNICAL FIELD

The disclosure is directed a wireless radio frequency (RF) front end circuit and a wireless signal boosting device having the wireless RF front end circuit.

BACKGROUND

In A wireless transceiver circuit includes a wireless transmitter and a wireless receiver operating at a radio frequency (RF) or a millimeter wave (mmWave) frequency. The wireless transceiver circuit could be a front end section of a wireless transceiver device and is connected to an intermediate frequency (IF) section or a baseband section of the wireless transceiver device. The wireless transceiver circuit may also be a standalone circuit enclosed by a chassis as a wireless signal boosting device which is also known as a repeater. The wireless receiver is typically configured to receive a wireless receive (Rx) signal of a specific frequency band and includes at least a low noise amplifier for amplifying the power as well as minimizing the noise figure of the received Rx signal. The wireless transmitter is typically configured to transmit a wireless transport (Tx) signal of a specific frequency band and includes at least a power amplifier which boosts the Tx signal for long distance transmission. Also, the wireless transceiver circuit may also include high frequency components that provide isolations between the Rx path and the Tx path of the wireless transceiver.

When the wireless transceiver circuit operates within a standalone wireless signal boosting device, there are several challenges. One of the challenges is that when the wireless signal boosting device operates under a time domain duplexing (TDD) mode, the wireless transmitter and the wireless receiver would often operate over either the same frequency or a partially overlapping frequency band. Under such circumstance, it would be helpful for the wireless transceiver circuit have a mechanism to provide a control to switch on or switch off either the transmitter or the receiver. Such control could be implemented by a control signal originating from a controller such as a microcontroller unit (MCU), by a central processing unit (CPU), or any equivalent; however, such control signal might be not available. Since the wireless signal boosting device does not know when a signal is to be transmitted or to be received, having such controller on board to turn on or turn off the Rx path or the Tx path might not serve any purpose. Moreover, the Tx path and the Rx path may suffer poor isolation as, for example, the signal from the Tx path may leak into the Tx path.

Furthermore, when the wireless transceiver circuit communicates with a base station, and there is a processor that provides the transmit and receive control signal to control the radio frequency front end (RFFE) circuit. When such control signal is missing, the wireless transceiver circuit may encounter operational difficulties.

Therefore, in order to meet the above-described challenges, additional circuit components would need to be added to existing wireless transceivers.

SUMMARY OF THE DISCLOSURE

In an order to meet the above described challenges, the disclosure is directed to a wireless RF front end circuit and a wireless signal boosting device having the wireless RF front end circuit.

In an aspect, the disclosure is directed to a wireless RF front end circuit which includes not limited to a first switch, a second switch, an adjustable amplifier circuit, and a detection circuit. The second switch is electrically connected to the first switch through a first path or a second path. The adjustable amplifier circuit is disposed in the first path between the first switch and the second switch. The detection circuit is electrically connected to the first switch and the second switch and configured to detect a transmitting signal, wherein the detection circuit configures the first switch and the second switch to enable the first path and disable the second path in response to the transmitting signal has been detected.

In another aspect, the disclosure is directed to a wireless signal boosting device which includes not limited to a casing, a connector, and a wireless radio frequency (RF) front end circuit. The connector is configured to be connected to a cable. The wireless RF front end circuit is enclosed by the casing and connected to the connector, wherein the wireless RF front end circuit comprising a first switch, a second switch, an adjustable amplifier circuit, and a detection circuit. The second switch is electrically connected to the first switch through a first path or a second path and electrically connected to the connector. The adjustable amplifier circuit is disposed in the first path between the first switch and the second switch. The detection circuit is connected to the first switch and the second switch and configured to detect a transmitting signal, wherein the detection circuit configures the first switch and the second switch to enable the first path and disable the second path in response to the transmitting signal has been detected.

In order to make the aforementioned-features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1 shows a hardware block diagram of a wireless transceiver circuit according to an exemplary embodiment of the disclosure.

DETAILED DESCRIPTION OF DISCLOSED EMBODIMENTS

Figure 1:
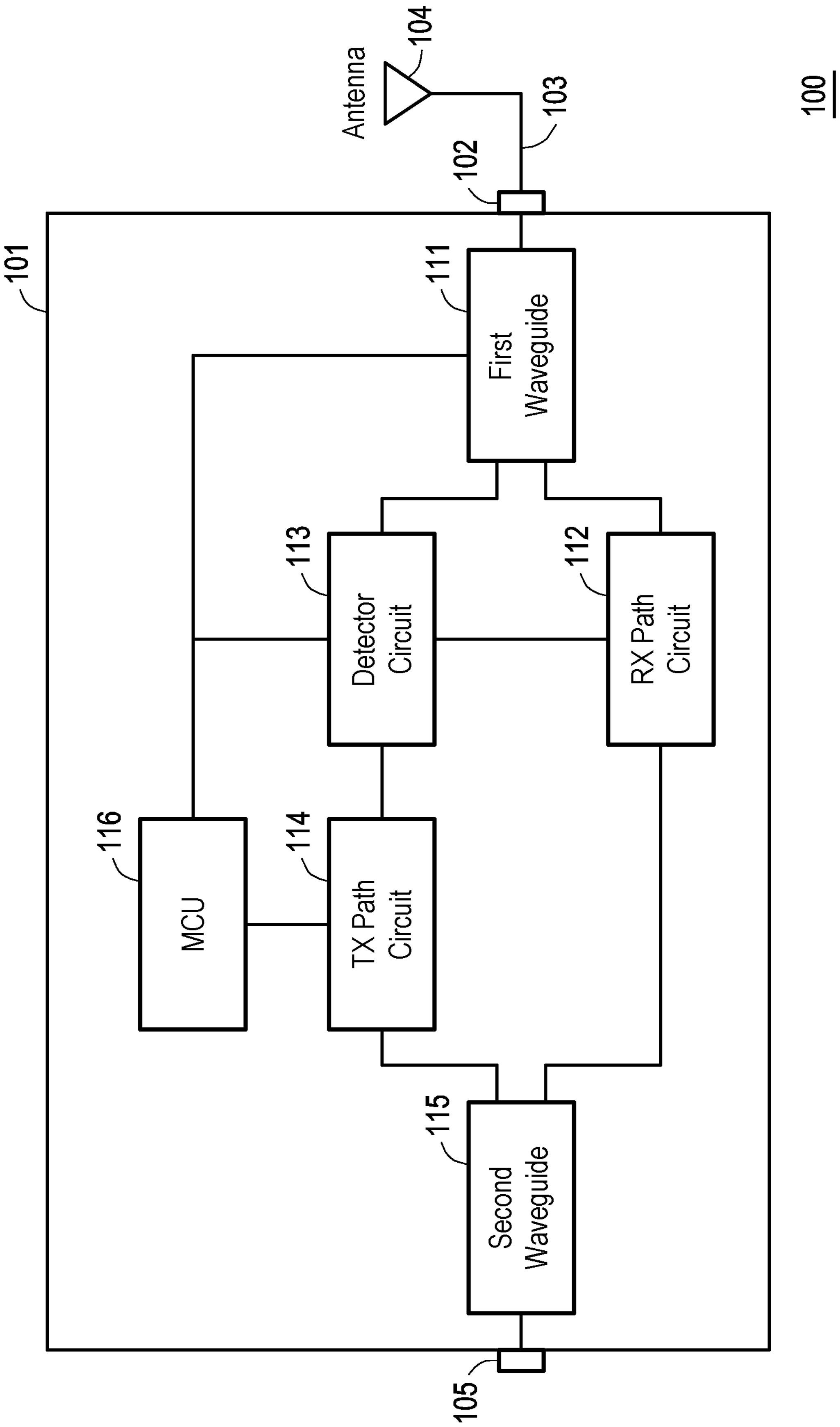
FIG. 1 illustrates

Reference will now be made in detail to the present exemplary embodiments of the disclosure, examples of which are illustrated in the accompanying drawings. Wherever possible, the same reference numbers are used in the drawings and the description to refer to the same or like parts.

A hardware block diagram of a wireless transceiver circuit 101 is shown in FIG. 1 for describing an inventive concept of the disclosure. The wireless transceiver circuit 101 may include not limited to a first waveguide 111, a RX path circuit 112, a Tx path circuit 114, a detection circuit 113, a second waveguide 115, and optionally a MCU 116, and the above describe elements could be located on one or more circuit boards on the same side or on different sides. The wireless transceiver circuit 101 could be a part of a wireless signal boosting device 100 which may include a first connector 102 connected to the first waveguide on the circuit board and a second connector 105 connected to the second waveguide on the circuit board. The first connector 102 is configured to be connected to a RF cable 103 or a coaxial cable 103 which could be up to many kilometers long and is connected to an antenna 104 or an antenna array 104.

The first waveguide 111, 150 may include a first port 150*b* configured to transmit a transport (Tx) signal to an antenna 104 or an antenna array 104 and to receive a receive (Rx) signal, a second port 150*c* configured to receive the Rx signal from the first port 150*b*, and a third port 150*a* configured to transmit the Tx signal to the first port 150*b*. The Rx path circuit 112 is connected to the second port 150*c* of the first waveguide 111 150 and configured to receive the Rx signal and to perform low noise amplification on the Rx signal. The Tx path circuit 114 configured to receive a pre-amplified signal from a second waveguide 115 120 so as to generate the Tx signal from the pre-amplified signal. The detection circuit 113 140 is connected between the Tx path circuit 114 and the third port 150*a* of the first waveguide 111 150 and configured to detect the Tx signal so as to turn on or turn off the Rx path circuit 112 in response to the Tx signal having been detected. The Tx signal and the Rx signal would operate under TDD on a same frequency spectrum. In other words, the frequency band of the Tx signal and the Rx signal would either be completely identical or partially overlap in order that the TDD mode of operation is adopted to avoid interfaces between the Tx signal and the Rx signal. An example of a device that operate under the TDD mode is a WiFi (e.g. IEEE 802.11 or similar) device.

The detection circuit 113 140 is configured to automatically detect the Tx signal so as to generate a first control signal 304 which turns on or turns off the Rx path circuit in response to the Tx signal having been detected without requiring any control signal external to the detection circuit 113 140. The detection circuit may include a directional coupler 301 including a first port 301*a* connected to the Tx path circuit, a second port 301*b* connected to the third port of the first waveguide, and a third port 301*c* connected to a power detector which is connected to a comparator. In response to the power detector 302 detecting a power level of the Tx signal from the directional coupler 301, the power detector 302 generates a detected voltage V1 in proportional to the power level of the Tx signal, and the detected voltage V1 is input into the comparator 303 to compare with a comparison voltage Vc so as to generate the first control signal 304.

The first waveguide 111 could be implemented by using a circulator 150 or an equivalent in which the first port 150*b* transmits to the second port 150*c*, and the third port 150*a* transmits to the first port 150*b*.

The Rx path circuit 112 may include a first isolator 160*w* connected to the second port 150*c* of the first waveguide and the comparator 303 configured to receive the first control signal 304 which turns off the first isolator 160*w* to provide a first isolation between the Rx path circuit 112 and the Tx path circuit 114. The first isolator 160*w* could be implemented by using a RF switch such as single pole double throw (SP2T) RF switch or an equivalent. The Rx path circuit 112 may further include a lower amplifier (LNA) 170 connected to the first isolator 160*w* and configured to minimize a noise figure of the Rx signal to generate a low noise Rx signal, and a second isolator 180*w* connected to the LNA 170 and the comparator 303 and configured to receive the first control signal 304 which turns off the second isolator 180*w* to provide a second isolation between the Rx path circuit 112 and the Tx path circuit 114. The second isolator 180*w* could also be implemented by using a RF switch such as single pole double throw (SP2T) RF switch or an equivalent.

The Tx path circuit 114 may include a power amplifier 130 configured to receive the pre-amplified signal from a first port 120*b* of the second waveguide 120 to generate the Tx signal which comes out of the power amplifier 130. A part of the Tx signal from the power amplifier 130 is transmitted to the third port 150*a* of the first waveguide 111 150, and a remaining part of the Tx signal is transmitted to the power detector 302 through the directional coupler 301.

The second waveguide may include a first port 120*b* connected to the power amplifier 130 and configured to transmit the pre-amplifier signal to the power amplifier 130, a second port 120*c* connected to the second isolator 180*w* and configured to receive the low noise Rx signal, and a third port 120*a* connected configured to transmit the low noise Rx signal and to receive the pre-amplifier signal.

According to an exemplary embodiment, the wireless transceiver circuit 101 may include a controller circuit 290 configured to detect the Tx signal from the power amplifier 130 and to transmit a second control signal to control the power amplifier 130.

Figure 2:
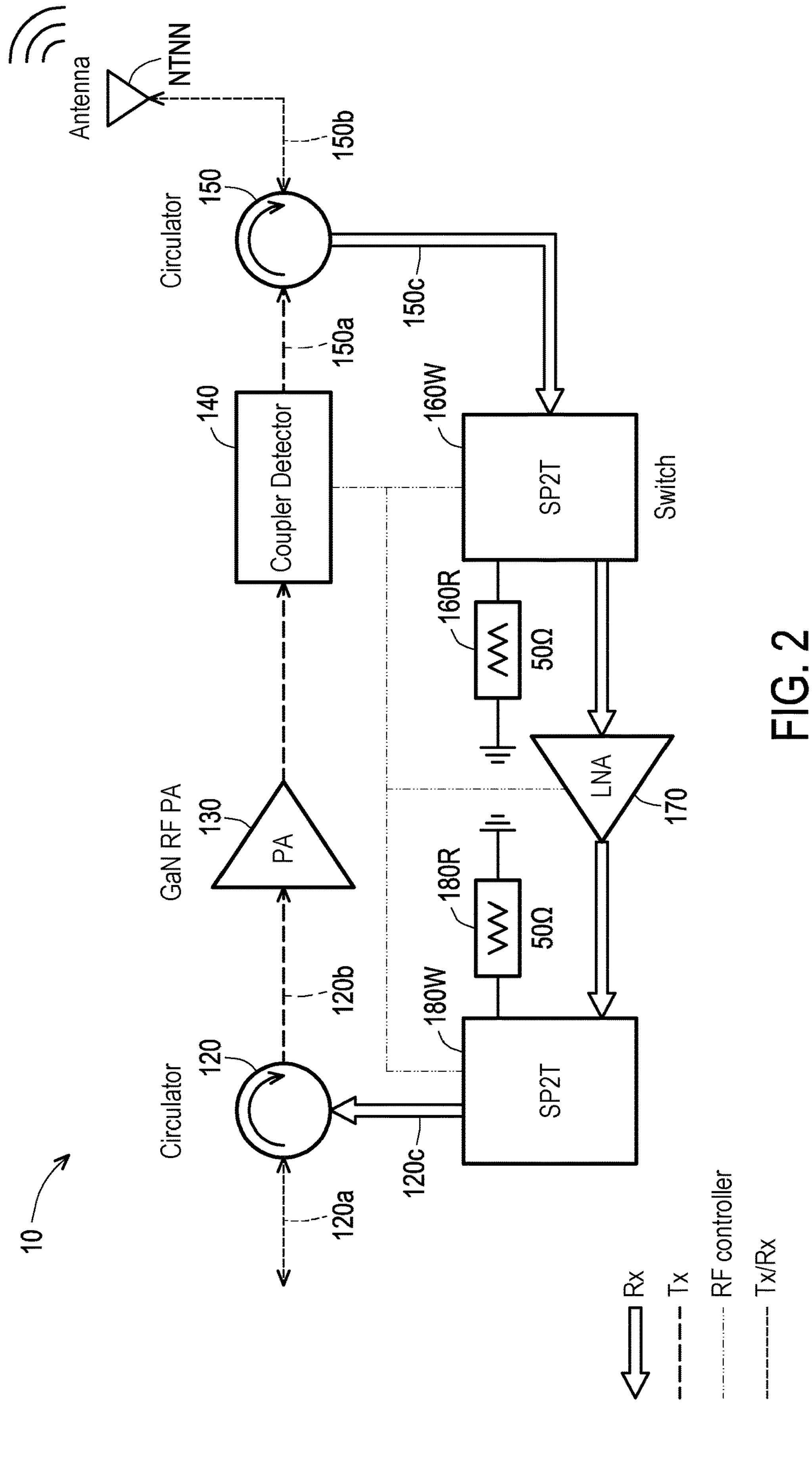
FIG. 2 shows a circuit diagram of a wireless transceiver circuit according to a first exemplary embodiment of the disclosure.

In order to further elucidate the above described inventive concept, the disclosure several exemplary embodiments as show in FIG. 2~FIG. 5 and described in their corresponding written descriptions. A circuit diagram of an embodiment of the wireless transceiver circuit (e.g. 101) is shown in FIG. 2. The wireless transceiver circuit 10 which is to be placed inside a chassis or a metal case may or may not be positioned near an antenna (e.g. 104 or NTNN). Since the exact deployment scenario is typically unknown for the maker of the wireless transceiver circuit 10, the first port 150 of the circulator 150 is to be connected to the antenna NTNN through a RF cable which could be up to many kilometers long. Under such circumstance, propagating an un-amplified signal between the antenna NTNN and the rest of the wireless transceiver circuit 10 located at quite a distance away may result in significant signal attenuation. To avoid such signal degradation, a power amplifier (PA) 130 is be arranged in the Tx signal path so as to amplify a pre-amplified Tx signal originated from the circulator 120 while a low noise amplifier (LNA) 170 is disposed in the Rx signal path so as to amplify RF signal received from the antenna NTNN as well as to minimize the noise figure (NF) of the RF signal received from the antenna NTNN.

It is, however, difficult to determine when or whether to switch to the Tx signal path or the Rx signal path since the wireless transceiver circuit 10 might not know when a Tx signal or a Rx signal is coming, and the switching between the Tx signal path and Rx signal path could not be accomplished without a control signal (e.g., a GPIO or MIPI signal) from a controller. Thus, the wireless transceiver circuit 10 is modified from a conventional wireless transceiver circuit to automatically determine the communication direction (e.g., an uplink or downlink direction) without requiring any supervision or instruction by an external controller or an external source. The circuit 10 would neither has knowledge of any predefined pattern for uplink and downlink allocation nor receives any control signal from an external controller or from a source that is outside of the wireless transceiver circuit 10. The wireless transceiver circuit 10 is configured to automatically switch between a receiving mode for receiving a Rx path signal from the antenna NTNN along a receiving path Rx and a transmitting mode for transmitting a Tx path signal to the antenna NTNN along a Transmitting path Tx.

The receiving path Rx involves the first circulator 150, the first RF isolator (i.e. RF switch) 160, the LNA 170, the second RF isolator (RF switch) 180, and the second circulator 120. The transmitting path Tx involves the second circulator 120, the PA 130, the coupler detector 140 113, and the first circular 150. The switching between the receiving mode and the transmitting mode is based on the power level of the signal in the transmitting path Tx measured by the coupler detector 140 of the wireless transceiver circuit 10. For example, when the signal power in the transmitting path Tx exceeds a threshold, the wireless transceiver circuit 10 switches to the transmitting mode. When the signal power in the transmitting path Tx falls below the threshold, the wireless transceiver circuit 10 switches to the receiving mode. The detection of the signal power in the transmitting path Tx is performed by the coupler detector 140 113.

In general, the coupler detector 140 may be any circuit for monitoring a signal power level of any point along the transmitting path Tx. In this disclosure, the coupler detector 140 is located between the PA 130 and the first circulator 150, but the disclosure does not limit the placement of the coupler detector 140 at this exact location. The coupler detector 140 may include a coupler which is electromagnetically coupled to a transmission line of the transmitting path Tx to measure the power level of the transmission line of the transmitting path Tx. In other words, the coupler detector 140 could be configured to identify the start time of a signal transmitted via the transmitting path Tx based on the power level being at a high level above a threshold and the end time of the power level of the signal falling below the threshold. The coupler detector 140 may convert the power level into a voltage level V1 which is then sent into a comparator for comparison with a comparison voltage Vc. When the voltage level V1 which represents the power level of the transmission line along the Tx transmission path exceeds the comparison voltage, the coupler detector 140 may automatically switch off the entire receiving path Rx.

Figure 3:
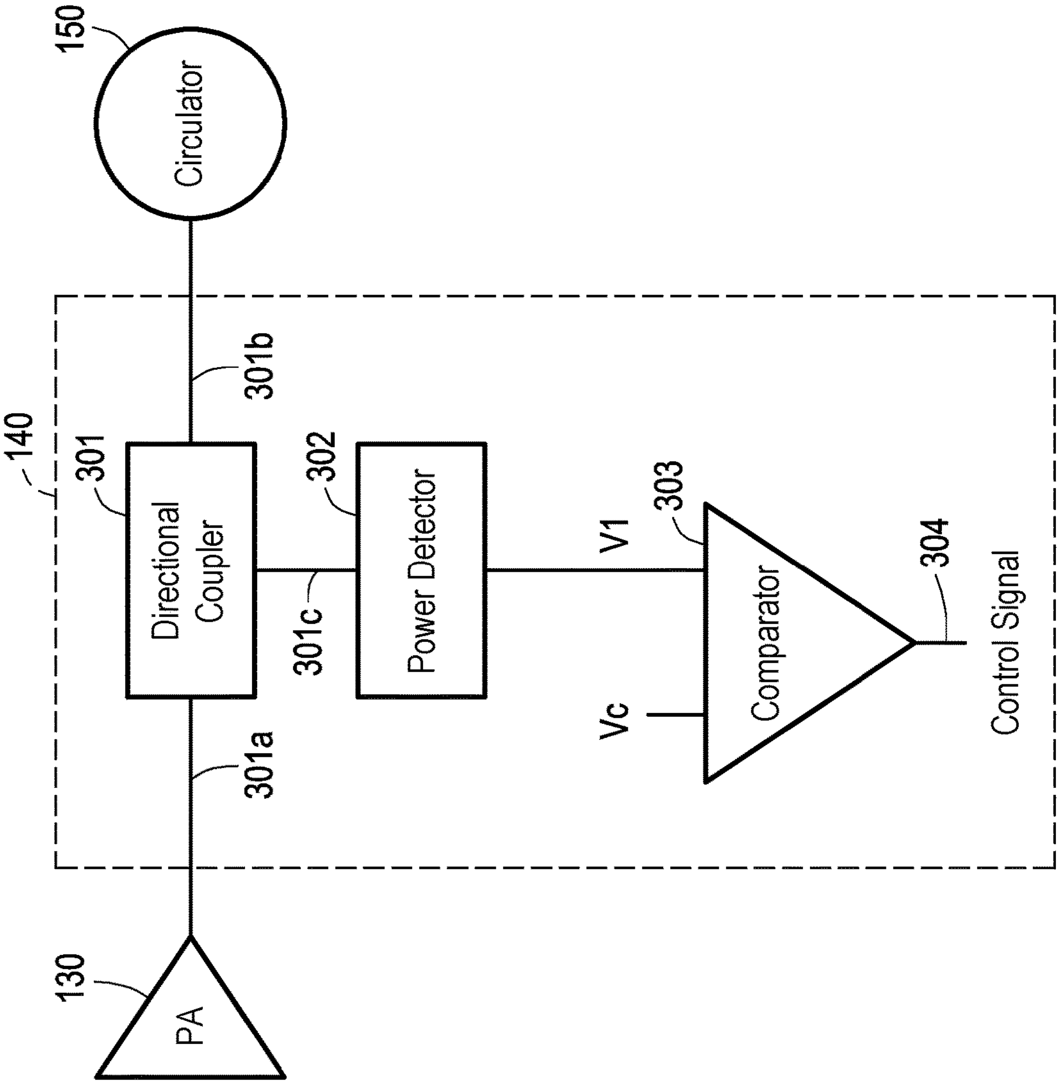
FIG. 3 shows a circuit diagram of a detection circuit according to an exemplary embodiment of the disclosure.

As an example, a circuit diagram of a coupler detector 140 or the detection circuit 113 is shown in FIG. 3. The exemplary coupler detector 140 includes a directional coupler 301, a power detector 302, and a comparator 303. The directional coupler is configured to transmit the Tx path signal from the PA 130 into the third port 150*a* of the first circulator 150, and a portion of the Tx path signal is re-directed to be received by the power detector 302 which is configured to translate the power detected from the directional coupler 301 into the voltage V1. The voltage V1 is then compared with a comparison voltage Vc by the comparator 303. When V1 exceeds Vc, the control signal 304 is at a first binary value (e.g. binary on voltage) which automatically turns off the Rx path circuit 112 which includes at least one or more or all of the first RF isolator 160W, the LNA 170, and the second RF isolator 180W. When V1 falls below Vc, the control signal 304 is at a second binary value (e.g. binary off voltage) which automatically turns on the Rx path circuit 112 which includes at least one or more or all of the first RF isolator 160W, the LNA 170, and the second RF isolator 180W.

The first RF isolator 160W and the second RF isolator 180W could be RF switches which provides RF isolation when turned off. For example, when the first RF switch 160W is turned off, the first RF switch may provide, for example, 26-30 dB of isolation between the Tx signal path and the Rx signal path. The circulator 150 may provide, for example, 15 dB of isolation. In addition, when the second RF switch 160W is turned off, the second RF switch may provide, for example, 26-30 additional dB of isolation between the Tx signal path and the Rx signal path for a total of up to around 75 dB. It should be noted that the disclosure is not limited to these particular levels of isolation for the first RF switch 160W and the second RF switch 180W.

Also, according to the comparison result of the comparator 303, the RF switches 160W, 180W could be controlled to disconnect one or more components in the receiving path Rx in a synchronized manner. In this example, the LNA 170 is disconnected from the first circulators 150 because of the first RF switch 160W is turned off, and the LNA is disconnected from the second circulator 120 because of the second switch 180W is turned off. In this example, the first circulator 150 is routed to the first resistor 160R through the first RF switch 160W, and the second circulator 120 is routed to the second resistor 180R through the second RF switch 180W. If the signal power level of the transmitting path Tx is not higher than the signal power threshold, the RF switches 160W, 180W may be controlled to connect the LNA 170 to the circulators 150, 120 respectively. In this way, the operation of the RF switches 160W, 180W of the receiving path Rx is related to the signal power level of the transmitting path Tx measured by the coupler detector 140.

Further, in this example, the wireless transceiver circuit 10 switches to the transmitting mode according to the power level of the transmitting path Tx. A pre-amplified RF signal may be received from an external transceiver or from an internal section by the second circulator 120 to be delivered from the third port 120*a* to the first port 120*b* to the PA 130. The PA 130 would perform power amplifying on the pre-amplified RF signal to generate a Tx path signal. The Tx path signal is transmitted through the coupler detector 140 to the first circulator 150 to be delivered to the antenna NTNN from the third port 150*a* to the first port 150*b* of the first circulator 150. As the detector coupler 140 has detected the power level of the RF signal in the transmitting path Tx exceeding a threshold, and the wireless transceiver circuit 10 enters the transmitting mode by disabling the receiving path Rx.

Moreover, if the detector coupler 140 fails to sense the power level of the RF signal in the transmitting path Tx being above the threshold, the wireless transceiver circuit 10 is switched to the receiving mode as the detector coupler 140 automatically transmit a control signal 304 to disable the receiving path Rx. If the receiving path Rx is enabled, the LNA 170 is enabled, and the RF switches 160W, 180W would be able to connect the circulators 150, 120 to the LNA 170. An RF signal may be transmitted from the antenna NTNN toward/through the circulator 150 from the first port 150*b* to the second port 150*c*, the first switch 160W, the LNA 170, the second switch 180W, and the circulator 120 from the second port 120*c* to the third port 120*a* in this chronological sequence and eventually reach the next component connected to the third port 120*a* of the second circulator 120.

In addition to regulating signal flow, the circulators 120 150 are configured to isolate the transmitting path Tx from the receiving path Rx. As shown by the relative positions of the third port 120*a* and the first port 120*b* of the circulator 120 along its circulator coupling direction, a RF signal entering the third port 120*a* is coupled to the first port 120*b*. Likewise, the first circulator 150 directs the RF signal entering the third port 150*a* to the first port 150*b*. The directionally selective coupling characteristic of the circulator 150 substantially reduces an RF signal propagating along the transmitting path Tx from coupling or otherwise leaking to the second port 150*c*. The isolation provided by the second circulator 120 is helpful since the RF signal received by the third port 120*a* of the second circulator 120 may otherwise enter the output terminal of the LNA 170, to be amplified by the LNA 170, and then be sent back to the component connected to third port 120*a*. Similarly, the directionally selective coupling characteristic of the second circulator 120 substantially reduces an RF signal propagating along the receiving path Rx from coupling or otherwise leaking to the first port 120*b*. As a result, the RF signal received from the antenna NTNN would seldom be amplified by the PA 130 or return to the antenna NTNN. The arrangement of the circulators 120, 150 to some extent isolates the RF signal amplified by the PA 130 or the LNA 170 from being fed back upon the PA 130 or the LNA 170 through the receiving path Rx or the transmitting path Tx.

Along with the circulators 120, 150, the switches 160W, 180W are configured to increase isolation between the transmitting path Tx and the receiving path Rx. As the switches 160W, 180W disconnect the LNA 170 from the circulators 120, 150 according to the detected power level of the transmitting path Tx, the circulators 120, 150 are terminated by the resistors 160R, 180R. Therefore, power leakage or coupling from the transmitting path Tx or reflection from the antenna NTNN may dissipate in the resistors 160R, 180R instead of entering the LNA 170.

The LNA 170 is configured to amplify the signal receive from the antenna NTNN to be transmitted to the third port 120*a* of the second circulator 120 and also to minimize or reduce the noise figure of such signal. The PA 130 is configured to amplify a pre-amplified signal received from the third port 120*a* of the second circulator 120 to be eventually transmitted to the antenna NTNN. The PA 130 could be a GaN PA. The LNA 170 and the PA 130 may compensate for the loss of the RF cables connected to the connector 102. With the LNA 170 or the PA 130, the wireless transceiver circuit 10 may not only fix signal attenuation problem but also increase RF communication coverage. Since the quality of signals from the wireless transceiver circuit 10 is improved, the data rate allocated to the next stage component (e.g. another transceiver) connected to the wireless transceiver circuit 10 through the third port of the second circulator 120 may be higher.

Figure 4:
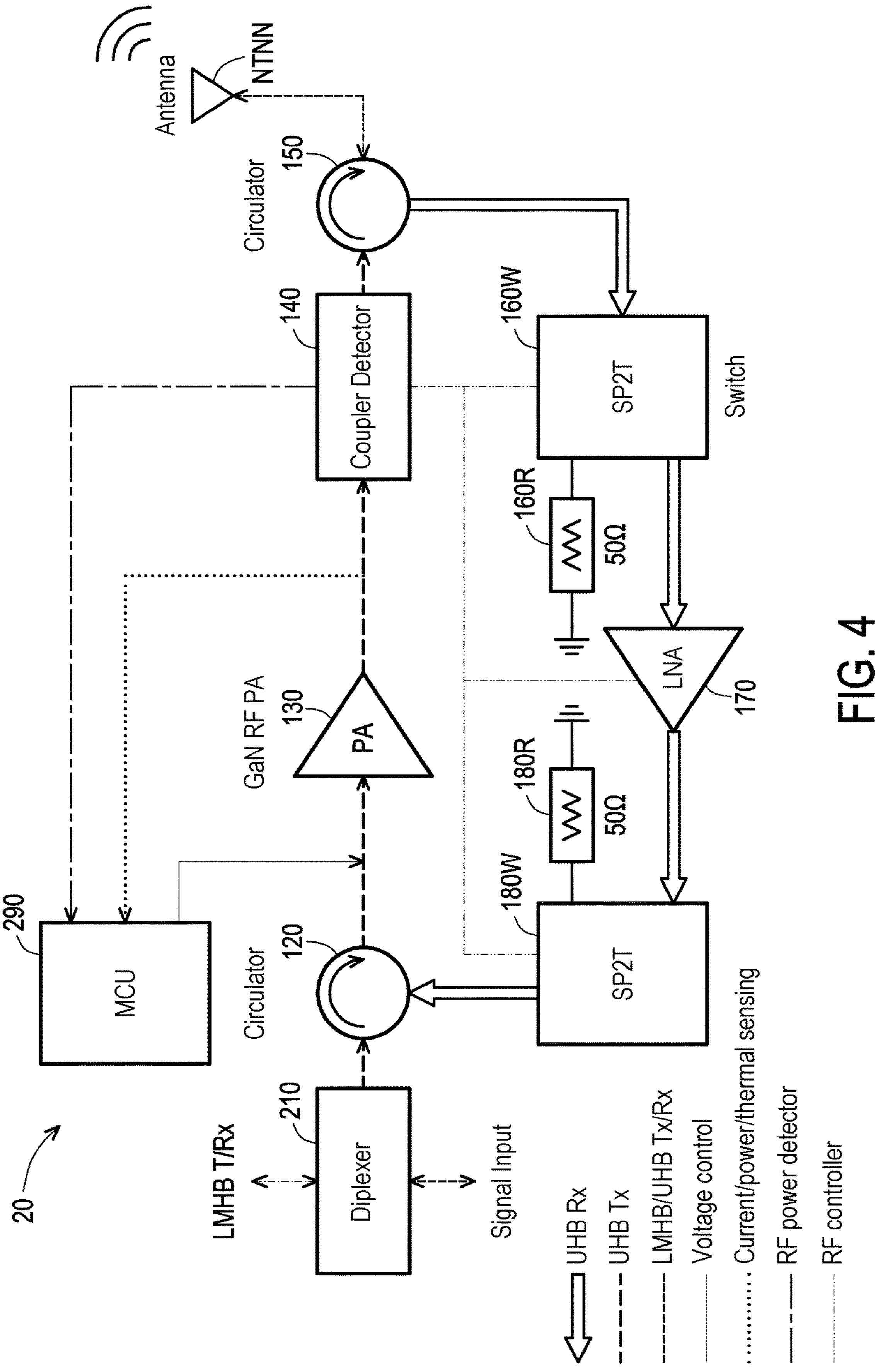
FIG. 4 shows a circuit diagram of a wireless transceiver circuit according to a second exemplary embodiment of the disclosure.

A circuit diagram of a wireless transceiver circuit according to another exemplary embodiment is shown in FIG. 4. The exemplary wireless transceiver circuit of FIG. 4 is similar to the wireless transceiver circuit of FIG. 2 except that it additionally includes a diplexer 210 and a microcontroller unit (MCU) 290. The diplexer 210 is configured to split/combine signals to/from two different paths (i.e. to split or combine a signal in a first band and another signal in a second band). While a signal in a first band (e.g., ultrahigh band (UHB)) may pass through the wireless transceiver circuit 20 to be transmitted to or received from the antenna NTNN, while the signal in the second band (e.g., low/middle/high band (LMHB)) may be received or transmitted from another antenna or another antenna array (not shown).

The rest of components of the circuit wireless transceiver circuit 20 (e.g., the circulators 120, 150, the PA 130, the switches 160W, 180W, or the LNA 170) is the same as the wireless transceiver circuit 10, and these components may have a finite bandwidth and reject out-of-band signal(s). The MCU 290 is configured to sense the condition of the PA 130 (e.g., the current, the power, or the temperature of the PA 130) so as to ensure that the PA 130 is operating under a required condition to prevent damage to the PA 130. More specifically, parameters of the PA 130 such as current, the power, or the temperature could be detected by the MCU 290 which would then transmit a second control signal to the PA 130 to control the operation of the PA 130.

Figure 5:
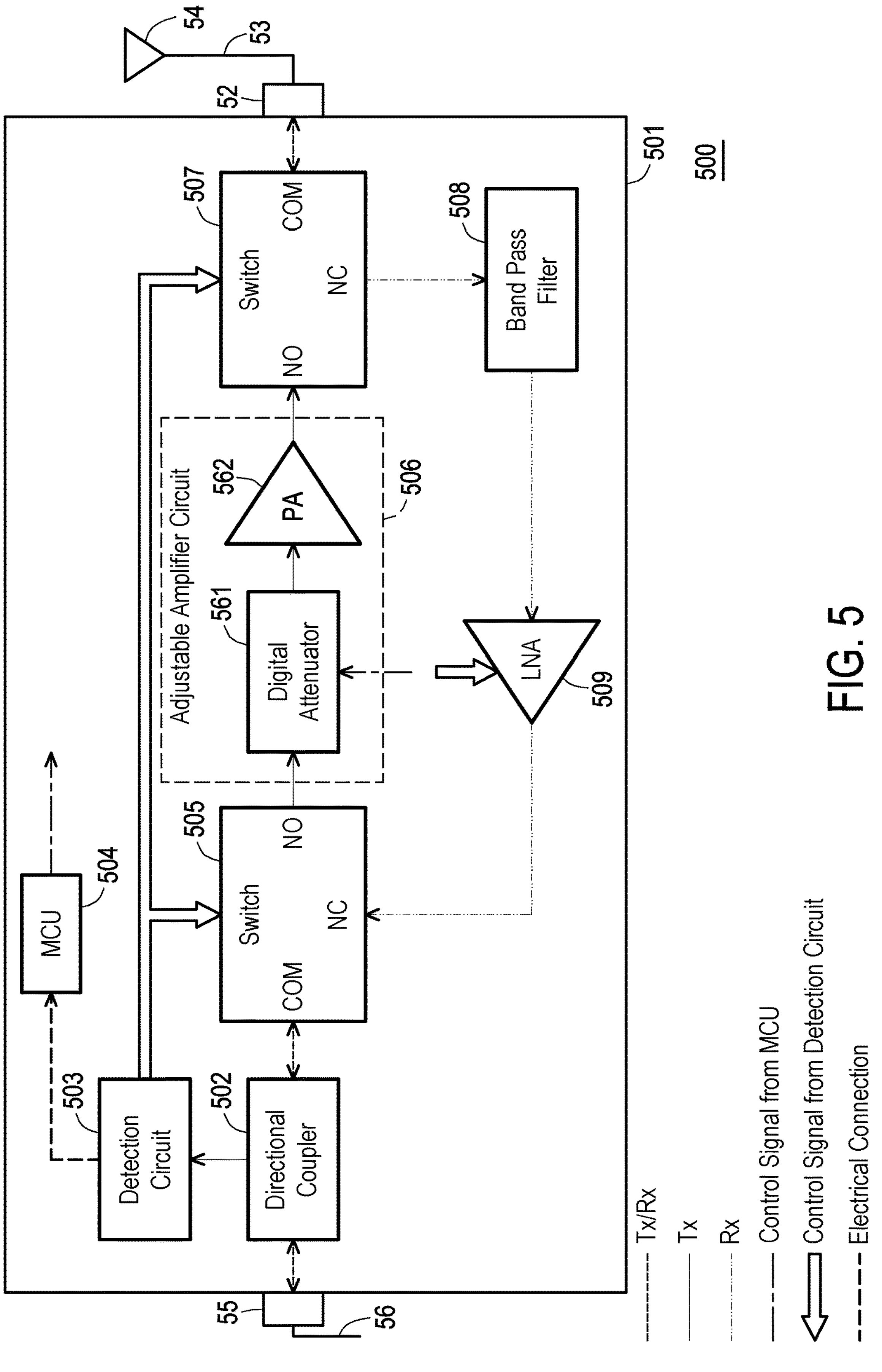
FIG. 5 shows a circuit diagram of a wireless RF front end circuit according to a third exemplary embodiment of the disclosure.

FIG. 5 shows a circuit diagram of a wireless RF front end circuit 501 according to a third exemplary embodiment of the disclosure. The wireless RF front end circuit 501 may include but not limited to a detection circuit 503, a switch 505, an adjustable amplifier circuit 506, and a switch 507. In one embodiment, the wireless RF front end circuit 501 may further include a directional coupler 502, an MCU 504, a band pass filter 508, or an LNA 509. The above described elements could be located on one or more circuit boards on the same side or different sides. The wireless RF front end circuit 501 could be a part of a wireless signal boosting device 500 which may include a connector 52 connected to the switch 507, a RF cable 53, an antenna 54 connected to the RF cable 53, and a connector 55 connected to the directional coupler 502. The connector 52 is configured to connect the switch 507 to the RF cable 53. The RF cable 53 is connected between the connector 52 and the antenna 54. The connector 55 is configured to connect the directional coupler 502 to a RF device such as a customer premise equipment (CPE).

The switch 505 or the switch 507 may be a single pole double throw (SPDT) switch, wherein the SPDT switch may have a common (COM) terminal, a normal open (NO) terminal, and a normal closed (NC) terminal. The switch 505 may be electrically connected to the switch 507 through a transmission path or a receiving path. The transmission path may be the path connected between the NO terminal of the switch 505 and the NO terminal of the switch 507, and the receiving path may be the path connected between the NC terminal of the switch 505 and the NC terminal of the switch 507. The COM terminal of the switch 505 may be configured to receive a transmitting signal from the directional coupler 502 or transmit a receiving signal to the directional coupler 502. The COM terminal of the switch 507 may be configured to receive a receiving signal from the connector 52 or transmit a transmitting signal to the connector 52.

The directional coupler 502 may be electrically connected between the connector 55 and the COM terminal of the switch 505, and the detection circuit 503 may be electrically connected to the directional coupler 502, the MCU 504, the switch 505, the switch 507, and the LNA 509. The detection circuit 503 may be configured to detect the voltage of the signal passing through the directional coupler 502, or more specifically, to detect the voltage of the transmitting signal pass through the directional coupler 502.

When a receiving signal from the COM terminal of the switch 505 passes to the connector 55 through the directional coupler 502, the voltage detected by the detection circuit 503 may be small. Accordingly, the detection circuit 503 may determine that no transmitting signal has been detected, and the detection circuit 503 may transmit control signals to the switch 505 and the switch 507, and the switch 505 and the switch 507 may disable the transmission path and enable the receiving path according to the control signals. That is, the control signals may configure the switch 505 (or the switch 507) to connect the COM terminal to the NC terminal.

When a transmitting signal from the connector 55 passes to the COM terminal of the switch 505 through the directional coupler 502, the voltage detected by the detection circuit 503 may be large. Accordingly, the detection circuit 503 may determine that a transmitting signal has been detected, and the detection circuit 503 may transmit control signals to the switch 505 and the switch 507 to configure the switch 505 and the switch 507, and the switch 505 and the switch 507 may enable the transmission path and disable the receiving path according to the control signals. That is, the control signals may configure the switch 505 (and the switch 507) to connect the COM terminal to the NO terminal.

The adjustable amplifier circuit 506 may be disposed in the transmission path between the NO terminal of the switch 505 and the NO terminal of the switch 507. The adjustable amplifier circuit 506 may amplify the transmitting signal passing through the transmission path by a gain (e.g., a fixed gain) so as to compensate for the loss of the cable(s), such as the cable 53 connected between the connector 52 and the antenna 54 or the cable 56 connected between the connector 55 and a communication device (e.g., a CPE). However, since the length of the cable 53 or cable 56 may be different in different scenarios, in some embodiments, the gain of the adjustable amplifier circuit 506 may be adjusted in order to prevent the power of the transmitting signal from being amplified beyond the specified limit.

The MCU 504 may be electrically connected to the adjustable amplifier circuit 506 and the detection circuit 503. The MCU 504 may transmit a control signal to the adjustable amplifier circuit 506 to adjust the gain of the adjustable amplifier circuit 506. In one embodiment, the MCU 504 may adjust the gain of the adjustable amplifier circuit 506 according to the voltage of the transmitting signal detected by the detection circuit 503. For example, the gain of the adjustable amplifier circuit 506 may be inversely proportional to the voltage of the transmitting signal. In one embodiment, the gain of the adjustable amplifier circuit 506 may be associated with the length of the cable 53. The MCU 504 may receive information of the length of the cable 53 and may adjust the gain of the adjustable amplifier circuit 506 according to the length of the cable 53. For example, the gain of the adjustable amplifier circuit 506 may be proportional to the length of the cable 53. For another example, the gain of the adjustable amplifier circuit 506 may be adjusted manually by the user. Specifically, the MCU 504 may be electrically connected to a terminal device (e.g., a computer) and may receive a user command from the terminal device. The MCU 504 may adjust the gain of the adjustable amplifier circuit 506 according to the user command.

The adjustable amplifier circuit 506 may include a digital attenuator 561 and a power amplifier (PA) 562. In one embodiment, the input terminal of the digital attenuator 561 may be electrically connected to the NO terminal of the switch 505 and the output terminal of the digital attenuator 561 may be electrically connected to the input terminal of the power amplifier 562. The output terminal of the power amplifier 562 may be electrically connected to the NO terminal of the switch 507. In one embodiment, the input terminal of the power amplifier 562 may be electrically connected to the NO terminal of the switch 505 and the output terminal of the power amplifier 562 may be electrically connected to the input terminal of the digital attenuator 561. The output terminal of the digital attenuator 561 may be electrically connected to the NO terminal of the switch 507.

The MCU 504 may be electrically connected to the digital attenuator 561 and may adjust the gain of the adjustable amplifier circuit 506 by sending a control signal to the digital attenuator 561 to adjust the attenuation. For example, the MCU 504 may increase the gain of the adjustable amplifier circuit 506 by decreasing the attenuation of the digital attenuator 561. On the other hand, the MCU 504 may decrease the gain of the adjustable amplifier circuit 506 by increasing the attenuation of the digital attenuator 561.

The LNA 509 is configured to amplify the receiving signal received from the antenna 54 and to minimize or reduce the noise figure of the receiving signal. The LNA 509 may be disposed in the receiving path between the NC terminal of the switch 505 and the NC terminal of the switch 507. The input terminal of the LNA 509 may be electrically connected to the NC terminal of the switch 507 and the output terminal of the LNA 509 may be electrically connected to the NC terminal of the switch 505. In one embodiment, the LNA 509 may be electrically connected to the detection circuit 503. If the transmitting signal has been detected by the detection circuit 503, the detection circuit 503 may send a control signal to the LNA 509 to disable the LNA 509. On the other hand, if the transmitting signal has not been detected by the detection circuit 503, the detection circuit 503 may send a control signal to the LNA 509 to enable the LNA 509.

The band pass filter 508 may be disposed in the receiving path between the NC terminal of the switch 505 and the NC terminal of the switch 507. The input terminal of the band pass filter 508 may be electrically connected to the NC terminal of the switch 507 and the output terminal of the band pass filter 508 may be electrically connected to the NC terminal of the switch 505.

In one embodiment, the LNA 509 and the band pass filter 508 may both be disposed in the receiving path between the NC terminal of the switch 505 and the NC terminal of the switch 507, wherein the output terminal of the band pass filter 508 may be electrically connected to the input terminal of the LNA 509, or the output terminal of the LNA 509 may be electrically connected to the input terminal of the band pass filter 508.

Figure 6:
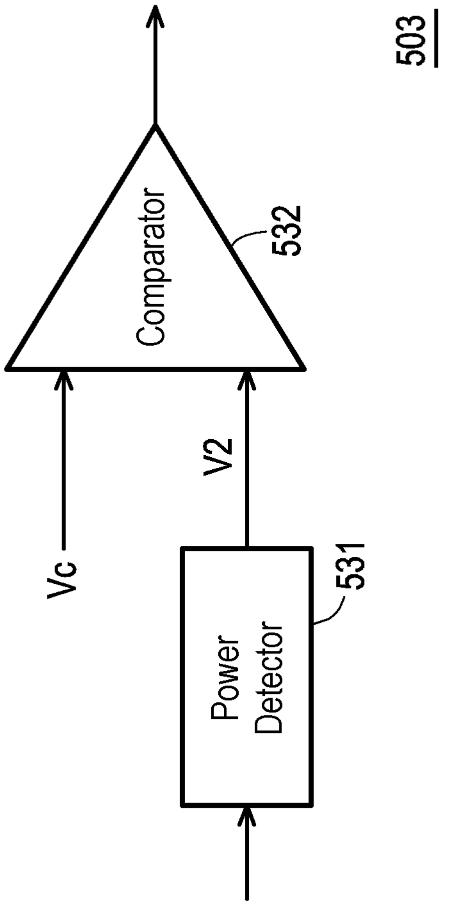
FIG. 6 shows a circuit diagram of a detection circuit according to an exemplary embodiment of the disclosure.

FIG. 6 shows a circuit diagram of a detection circuit 503 according to an exemplary embodiment of the disclosure. The detection circuit 503 may include a power detector 531 and a comparator 532. The comparator 532 include an output terminal and two input terminals. The output terminal of the comparator 532 may be electrically connected to the switch 505, the switch 507, the LNA 509, or the MCU 504. One of the input terminals of the comparator 532 may be electrically connected to the output terminal of the power detector 531. The other input terminal of the comparator 532 may be electrically connected to a source of a comparison voltage Vc.

The power detector 531 may be coupled with the directional circuit 502 and may be configured to detect the voltage V2 of the transmitting signal from the directional coupler 502. The comparator 532 may compare the detected voltage V2 and the comparison voltage Vc to determine whether a transmitting signal has been detected or not. If the voltage V2 is greater than the comparison voltage Vc, the detection circuit 503 may determine that a transmitting signal has been detected. The comparator 532 may send control signals to the MCU 504, the switch 505, the switch 507, or the LNA 509. For example, the comparator 532 may send the control signal to the MCU 504 to inform the MCU 504 to adjust the gain of the adjustable amplifier circuit 506. The comparator 532 may send the control signals to the switch 505 and the switch 507 to configure the switch 505 and the switch 507 to enable the transmission path and disable the receiving path. The comparator 532 may send the control signal to the LNA 509 to disable the LNA 509.

On the other hand, if the voltage V2 is less than or equal to the comparison voltage Vc, the detection circuit 503 may determine that no transmitting signal has been detected. The comparator 532 may send control signals to the switch 505, the switch 507, or the LNA 509. For example, the comparator 532 may send the control signals to the switch 505 and the switch 507 to configure the switch 505 and the switch 507 to disable the transmission path and enable the receiving path. The comparator 532 may send the control signal to the LNA 509 to enable the LNA 509.

In view of the aforementioned-descriptions, the disclosure is suitable for being used in a wireless communication system operating under RF or mmWave frequency and is able to perform switching of the Rx path circuit without requiring a control signal from an external controller when operating under the TDD mode.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A wireless radio frequency (RF) front end circuit, comprising:

a first switch;

a second switch, electrically connected to the first switch through a first path or a second path;

an adjustable amplifier circuit, disposed in the first path between the first switch and the second switch;

a detection circuit, electrically connected to the first switch and the second switch and configured to detect a transmitting signal, wherein the detection circuit configures the first switch and the second switch to enable the first path and disable the second path in response to the transmitting signal has been detected; and a controller, electrically connected to the detection circuit and the adjustable amplifier circuit, wherein the controller adjusts a gain of the adjustable amplifier circuit, wherein the adjustable amplifier circuit comprises:

a power amplifier; and a digital attenuator, electrically connected to the power amplifier and the controller, wherein the controller transmits a control signal to the digital attenuator to adjust the gain of the adjustable amplifier circuit.

2. The wireless RF front end circuit of claim 1, wherein the detection circuit configures the first switch and the second switch to disable the first path and enable to the second path in response to the transmitting signal has not been detected.

3. The wireless RF front end circuit of claim 1, wherein the controller adjusts the gain of the adjustable amplifier circuit according to a voltage of the transmitting signal.

4. The wireless RF front end circuit of claim 1, wherein the gain of the adjustable amplifier circuit is associated with a length of a cable, wherein the cable is connected between the second switch and an antenna.

5. The wireless RF front end circuit of claim 1, wherein the detection circuit comprising:

a power detector, configured to detect a voltage of the transmitting signal; and a comparator, electrically connected to the power detector, the first switch, and the second switch, wherein the comparator compares the detected voltage and a comparison voltage to determine whether the transmitting signal has been detected or not.

6. The wireless RF front end circuit of claim 5, wherein the comparator configures the first switch and the second switch to enable the first path and disable the second path in response to the detected voltage being greater than the comparison voltage.

7. The wireless RF front end circuit of claim 1, wherein the first switch comprising:

a single pole double throw switch, wherein the single pole double throw switch comprises a common terminal configured to receive the transmitting signal or transmit a receiving signal, a normal open terminal electrically connected to the second switch through the first path, and a normal closed terminal electrically connected to the second switch through the second path.

8. The wireless RF front end circuit of claim 1, wherein the second switch comprising:

a single pole double throw switch, wherein the single pole double throw switch comprises a common terminal configured to transmit the transmitting signal or receive a receiving signal, a normal open terminal electrically connected to the first switch through the first path, and a normal closed terminal electrically connected to the first switch through the second path.

9. The wireless RF front end circuit of claim 1, further comprising:

a directional coupler, electrically connected to the first switch and the detection circuit, wherein the detection circuit detects a voltage of the transmitting signal from the directional coupler.

10. The wireless RF front end circuit of claim 9, wherein the gain of the adjustable amplifier is associated with a length of a cable, wherein the cable is connected between the directional coupler and a customer premise equipment.

11. The wireless RF front end circuit of claim 1, further comprising:

a low-noise amplifier, disposed in the second path between the first switch and the second switch, wherein the detection circuit enables the low-noise amplifier in response to the transmitting signal have not been detected.

12. The wireless RF front end circuit of claim 1, further comprising:

a band pass filter, disposed in the second path between the first switch and the second switch.

13. A wireless signal boosting device, comprising:

a casing;

a connector configured to be connected to a cable; and a wireless radio frequency (RF) front end circuit, enclosed by the casing and connected to he connector, wherein the wireless RF front end circuit comprising:

a first switch;

a second switch, electrically connected to the first switch through a first path or a second path and electrically connected to the connector;

an adjustable amplifier circuit, disposed in the first path between the first switch and the second switch;

a detection circuit, connected to the first switch and the second switch and configured to detect a transmitting signal, wherein the detection circuit configures the first switch and the second switch to enable the first path and disable the second path in response to the transmitting signal has been detected; and a controller, electrically connected to the detection circuit and the adjustable amplifier circuit, wherein the controller adjusts a gain of the adjustable amplifier circuit, wherein the adjustable amplifier circuit comprises:

a power amplifier; and a digital attenuator, electrically connected to the power amplifier and the controller, wherein the controller transmits a control signal to the digital attenuator to adjust the gain of the adjustable amplifier circuit.

* * * * *